July 21, 1970  E. C. WINGFIELD ET AL  3,521,193

MAGNETIC FIELD BEAM SCANNER FOR GAS LASERS

Filed Nov. 29, 1967

INVENTORS
EDWARD C. WINGFIELD
ROBERT K. ERF

BY Donald F. Bradley
ATTORNEY

United States Patent Office
3,521,193
Patented July 21, 1970

3,521,193
MAGNETIC FIELD BEAM SCANNER FOR GAS LASERS
Edward C. Wingfield, Wethersfield, and Robert K. Erf, Glastonbury, Conn., assignors to United Aircraft Corporation, East Hartford, Conn., a corporation of Delaware
Filed Nov. 29, 1967, Ser. No. 686,657
Int. Cl. H01s 3/05
U.S. Cl. 331—94.5    4 Claims

ABSTRACT OF THE DISCLOSURE

Three orthogonally directed magnetic fields are generated and applied to a gaseous laser to produce an axis of magnetic symmetry internal to the laser medium. The laser light beam is steered by the magnetic field and is propagated along the axis of symmetry. The position of the symmetry axis of the magnetic field may be electrically varied or programmed to cause the laser beam to scan a two-dimensional field of view.

BACKGROUND OF THE INVENTION

Field of invention

This invention relates to lasers, and particularly to gaseous discharge lasers in which the direction of the emitted laser light beam is controlled by means of a magnetic field.

More specifically, this invention relates to the generation of a magnetic field having an axis of symmetry within a gas laser. The magnetic field is generated by three orthogonally directed sets of coils or solenoids positioned adjacent and/or surrounding the gas laser which generate separate magnetic fields in the X, Y and Z directions. The resultant magnetic field causes the direction of laser beam emission to be varied, the laser beam being emitted along the axis of symmetry of the resultant magnetic field. By selectively varying the amplitude and phase of the individual magnetic fields, the laser beam may be scanned to sequentially illuminate a two-dimensional field of view; or, in another mode of operation, the amplitude and phase of the magnetic fields may be set to continuously steer the laser beam to a selected position within a field of view.

Description of the prior art

Numerous devices are available in the prior art to bend or refract a laser beam. Specifically, acoustic cells positioned in the path of a laser beam will produce continuous scanning by refracting the laser beam. However, losses are always present in this type of system, and in addition the scanning must be continuous. Furthermore, the scanning angles produced by acoustic or similar types of cells are limited at present to a few degrees at best.

Other types of beam scanners have the same disadvantages, namely, objectionable losses and small scanning angles. In addition, scanning is generally produced only by means external to the laser itself.

SUMMARY OF INVENTION

It is therefore an object of this invention to provide a novel laser beam scanner.

Another object of this invention is a beam scanner for gas discharge lasers in which a magnetic field is generated within the laser element.

A further object of this invention is a novel laser beam scanner in which three orthogonal magnetic fields are generated internally to a laser to produce a resultant magnetic field which deflects the emerging laser beam.

In accordance with a preferred embodiment of this invention, three sets of Helmholtz coils or similar coils or solenoids are positioned adjacent and/or surrounding a gas discharge laser, and a controlled DC current is applied to the coils to generate three intersecting magnetic fields within the laser element in the X, Y and Z directions. The resultant of the three magnetic fields produces an axis of magnetic symmetry within the laser element which deflects the laser beam from its normal direction parallel to the laser tube axis. Varying the amplitude and phase of the current through the coils which control the magnetic fields will cause the laser beam to scan a two-dimensional area. Varying the intensity of the resultant magnetic field will vary the current density of the laser beam.

DESCRIPTION OF THE PREFERRED EMBODIMENT

Figure 1:
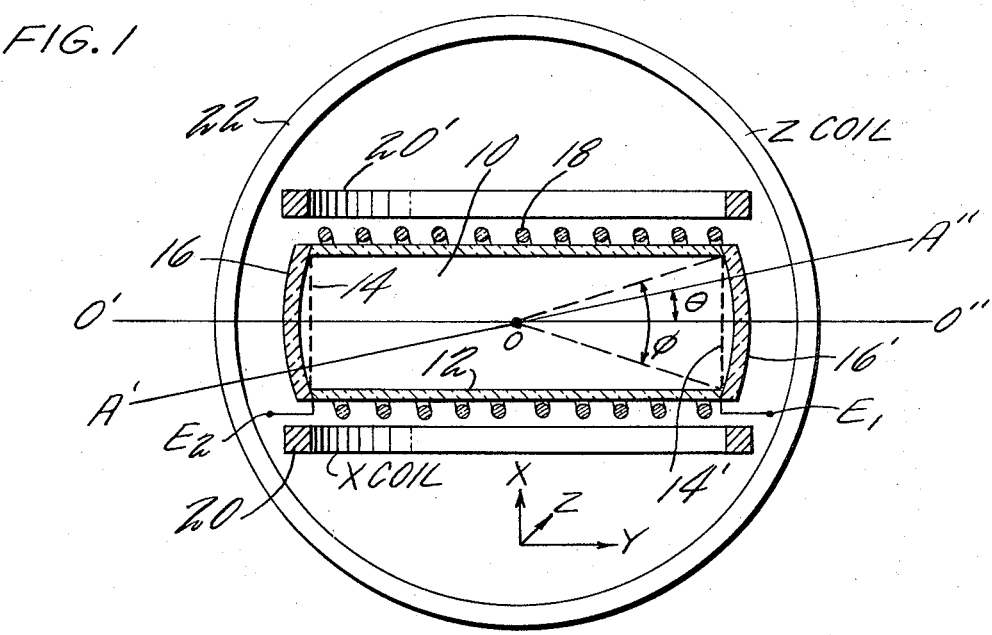
FIG. 1 is a schematic representation of a preferred embodiment of this invention.

Referring to FIG. 1, there is shown a gaseous discharge laser 10 such as argon or carbon dioxide. Such lasers are well known in the art, and consist of a gas vapor or gas mixture as the active medium in which a conduction current is maintained by ionization. The gas is normally contained in a sealed glass or quartz tube or envelope 12.

The ionization of the gas is caused by collisions between electrons and atoms or molecules of the gas, the energy being supplied by an external source such as a DC electric field applied between grids 14 and 14' by voltage sources $E_1$ and $E_2$. Radio frequency or other excitation may be provided in place of DC excitation, in which case grids 14 and 14' may not be required. The function of the gas discharge is to pump the active medium in order to obtain a population inversion.

For laser action an optical feedback cavity or resonator for the lasing element is required, and normally comprises a facing pair of parallel flat mirrors or spherical reflectors. In oder to practice this invention two spherical mirrors 16 and 16' are required. The axes of the mirrors are shown as the line 0'0''. Both mirrors have a focus at point 0, the center of symmetry of the optical cavity. With this arrangement the normal laser discharge will take place along line 0'0'', and may be either a pulsating discharge or a continuous amplitude (CW) beam.

A magnetic field is established within the laser element by an arrangement of coils and/or solenoids as shown in FIG. 1. A solenoid 18 comprising a number of turns of wire is positioned about the laser tube 12 with its axis coincident with the axis of laser tube 12 to generate a magnetic field within the laser tube along the Y axis.

A second magnetic field is established within the laser tube along the X axis, that is, from top to bottom and perpendicular to the Y axis, by means of a pair of coils 20 and 20' positioned at the top and bottom of the laser tube.

A third magnetic field is established along the Z axis of the laser, that is, into the plane of the paper and perpendicular to the X and Y axes, by means of a second pair of coils 22, only one of which is shown. The coils 22 are positioned in front of and behind the laser tube as viewed in FIG. 1.

The Y-axis, the X-axis and the Z-axis coils are energized by applying a controlled DC current to each, thereby producing in the laser tube a composite magnetic field typically shown in FIG. 1 as line A'–A'', that is, a magnetic field which has an axis of symmetry deviated from the line 0'–0'' by angle $\theta$. By varying the DC current to the X and Z axis coils 20 and 22, the magnetic axis of symmetry A'–A" may be varied dynamically or statically in a random or programmed fashion in two dimensions, X and Z. The axis of symmetry of the magnetic field A'–A" passes through the point of symmetry, 0, of the optical cavity, and hence as line A'–A" varies in two dimensions it will always remain perpendicular to the surface of each of the mirrors 16 and 16'. Thus the desirable property of optical feedback within the optical cavity will be maintained as the direction of line A'–A" varies.

In operation an electrical discharge is maintained between electrodes 14 and 14'. The resultant magnetic field line A'–A" will restrict the majority of the discharge to occur along the line A'–A", and hence the most intense laser action will be along line A'–A". Consequently as the magnetic field coils are programmed to produce a change in the direction of line A'–A", the direction of the transmitted laser light will also change and coincide with line A'–A". The laser light may be transmitted at any point within the solid angle $\phi$ which mirrors 16 and 16' subtend when viewed from point 0.

One symmetry condition has been shown in FIG. 1; obviously other symmetry conditions are possible. As long as the axis of the magnetic field remains in a position relative to the mirrored surfaces so that positive feedback is obtained within the optical cavity, laser action will be produced, and scanning of the resultant laser beam will be possible.

Figure 2:
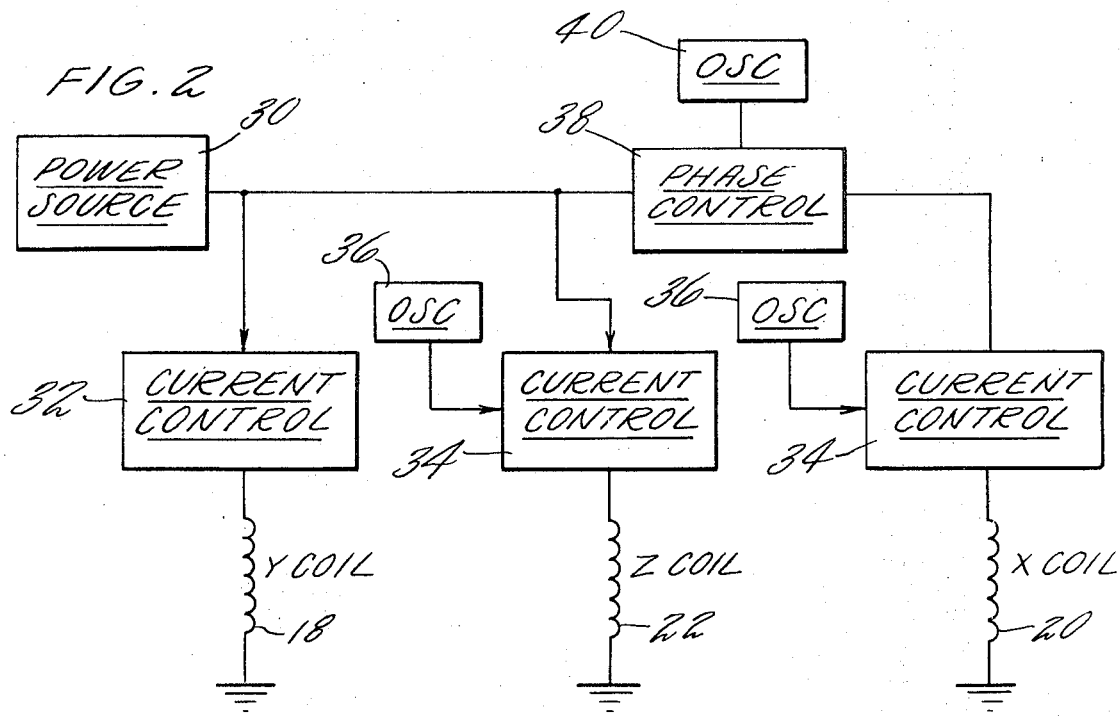
FIG. 2 shows in block diagram form an electrical control system associated with the apparatus of FIG. 1.

FIG. 2 shows schematically one control system for regulating the current and thus the magnetic fields produced by the coils.

A power source 30 produces a DC voltage which generates a DC current in Y coil 18. Current control 32 regulates the magnitude of the DC current fed to Y coil 18, and may be programmed to vary the current as a function of time or otherwise.

Power source 30 also feeds current controls 34 which regulates the current to the X and/or Z coils 20 and 22 to control their respective magnetic fields. Oscillators 36 may be used to supply an alternating or cyclical component to the current controls 34. A phase control 38 fed by an oscillator 40 controls the phase relationship between the currents in the X and Z coils.

The simplest operational example of the beam scanner is one in which a circular scan is produced. A constant DC current is supplied to the Y coil 18. Sinusoidal currents of identical frequency and amplitude but 90° removed in phase are supplied to the X and Z coils by current controls 34. The circular scan will have its center about mid-line 0'–0" if the sinusoidal current signals are symmetrical about zero. At any moment in time the X, Y and Z magnetic fields add vectorially to produce the resultant field A'–A" which directs the laser beam. Other patterns of scan are readily apparent.

If it is desired to continuously steer the laser beam along a selected path rather than apply a scanning motion to the beam, the oscillators 36 will be inactivated, and current controls 34 will be set together with phase control 38 to provide currents in the X and Z coils which will generate a constant resultant magnetic field.

We claim:
1. A laser scanning device comprising:
an active laser medium containing gaseous ions,
a spherical mirror positioned at each end of said laser medium to form an optical feedback cavity for said medium, said medium and said mirrors being positioned so that lasing of said medium may occur in a plurality of angularly related directions,
a plurality of magnetic field coils positioned adjacent said laser medium,
means for selectively generating a current flow in said coils to produce a resultant magnetic field coupling said laser medium, said resultant magnetic field being of a magnitude and direction to confine the lasing of said medium to one of the said angularly related directions,
and means for selectively varying the flow of current in said field coils to control the direction of said resultant magnetic field and to vary the direction along which the said lasing is confined.

2. A laser scanning device as in claim 1 in which each of said spherical mirrors has a center of curvature lying on a line which passes through the center of symmetry of said optical cavity,
said resultant magnetic field having an axis of symmetry which passes through the center of symmetry of said optical cavity.

3. A laser scanning device as in claim 1 in which said plurality of magnetic field coils comprise:
a first coil positioned about said laser medium and concentric therewith, said first coil producing a first magnetic field longitudinal to the axis of said laser medium,
a second coil including first and second portions positioned on opposite sides of said laser medium parallel to the longitudinal axis thereof and producing a second magnetic field perpendicular to said first magnetic field,
and a third coil including first and second portions positioned on opposite sides of said laser medium parallel to the longitudinal axis thereof and producing a third magnetic field perpendicular to said first and second magnetic fields,
said first, second and third magnetic fields interacting to produce said resultant magnetic field.

4. A laser device as in claim 1 in which said current varying means includes oscillator means for generating a cyclically varying current flow in said coils to generate a cyclic two dimensional scan of said laser beam.

References Cited

UNITED STATES PATENTS

| | | | |
|---|---|---|---|
| 3,258,717 | 6/1966 | Katzman | 331—94.5 |
| 3,292,103 | 12/1966 | Soules et al. | 331—94.5 |
| 3,344,365 | 9/1967 | Lewis | 331—94.5 |
| 3,413,568 | 11/1968 | Jordon et al. | 331—94.5 |

OTHER REFERENCES

Pole: IBM Tech. Disc. Bull., vol. 12, p. 1200, May 1965.

Pole et al.: Optical and Electro-Optical Information Processing, edited by Tippett et al., Massachusetts Institute of Technology Press, Cambridge, 1965, pp. 351–364.

RONALD L. WIBERT, Primary Examiner

E. BAUER, Assistant Examiner